United States Patent [19]
Vogt

[11] 3,743,039
[45] July 3, 1973

[54] WEIGHT SCALE STRUCTURE

[76] Inventor: Norman H. Vogt, 457 Fisher Court, Clawson, Mich. 48017

[22] Filed: Apr. 12, 1971

[21] Appl. No.: 133,298

[52] U.S. Cl. .................................. 177/16, 177/257
[51] Int. Cl. ..................... G01g 11/14, G01g 21/08
[58] Field of Search.................. 177/257, 258, 259, 177/208–211, 52, 53, 119–121, 16, DIG. 8

[56] References Cited
UNITED STATES PATENTS

| | | | |
|---|---|---|---|
| 2,133,760 | 10/1938 | Williams | 177/DIG. 8 |
| 2,422,167 | 6/1947 | Hem | 177/16 |
| 2,543,794 | 3/1951 | Mayer | 177/DIG. 8 |
| 2,954,969 | 10/1960 | McCullough et al. | 177/16 |
| 3,101,800 | 8/1963 | Raskin | 177/DIG. 8 |
| 1,171,998 | 2/1916 | Winslow | 177/258 |
| 397,464 | 2/1889 | Lewis | 177/208 |
| 299,762 | 6/1884 | Brul | 177/257 |
| 714,555 | 11/1902 | Austin | 177/258 |
| 1,670,597 | 5/1928 | Stubbs | 177/259 |
| 1,844,080 | 2/1932 | Troll | 177/208 |
| 3,164,218 | 1/1965 | McClimon | 177/208 |
| 3,191,701 | 6/1965 | Gray | 177/209 |

FOREIGN PATENTS OR APPLICATIONS

| | | | |
|---|---|---|---|
| 464,811 | 1/1914 | France | 177/16 |
| 877,944 | 9/1961 | Great Britain | 177/16 |
| 1,195,058 | 6/1970 | Great Britain | 177/16 |
| 9,426 | 1911 | Great Britain | 177/208 |
| 170,608 | 3/1952 | Austria | 177/257 |
| 218,558 | 4/1957 | Australia | 177/208 |
| 231,116 | 3/1925 | Great Britain | 177/208 |
| 271,314 | 5/1927 | Great Britain | 177/209 |
| 29,989 | 6/1933 | Netherlands | 177/258 |

*Primary Examiner*—George H. Miller, Jr.
*Attorney*—William T. Sevald

[57] ABSTRACT

A fast acting substantially unmoving and relatively unvarying weight scale structure measuring a proportion of the power developed by the imposition of the total weight load by imposing ambient portions of the total weight load at random on known weight bearing points on like beams similarly fulcrumed and cumulating known beam power proportions of the unknown weight portions on each beam in a known total proportion of the power and reading the total proportion of power in terms of the total weight load.

1 Claim, 7 Drawing Figures

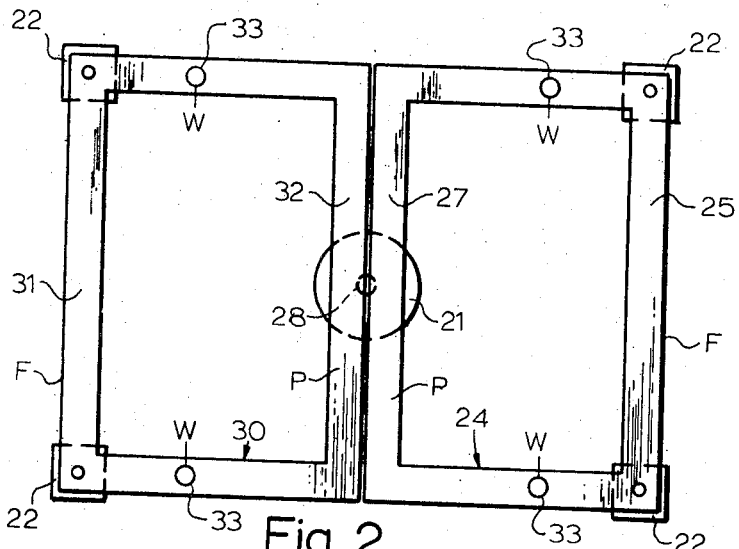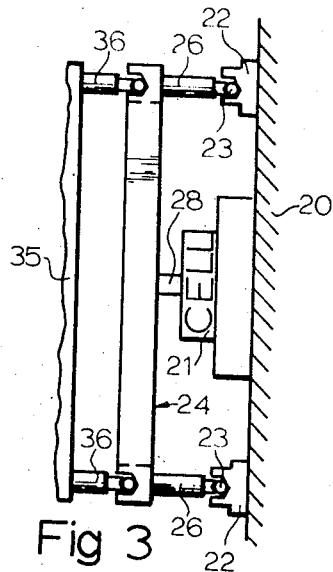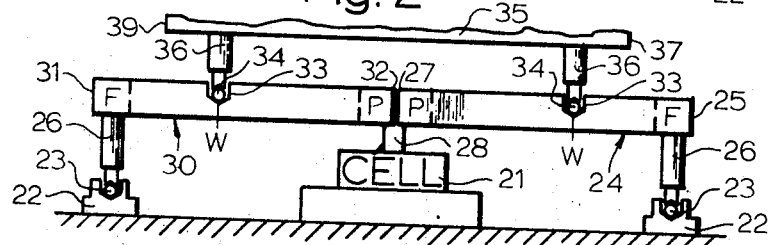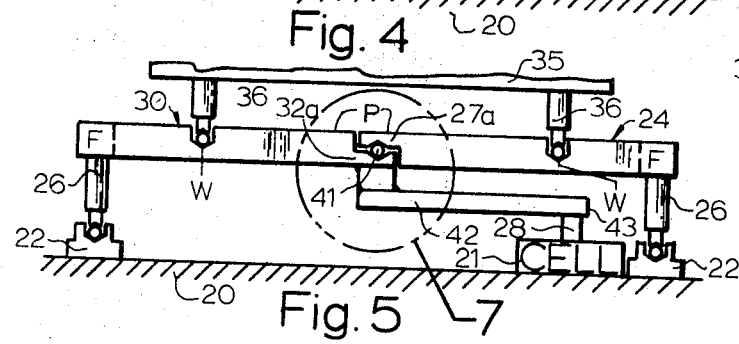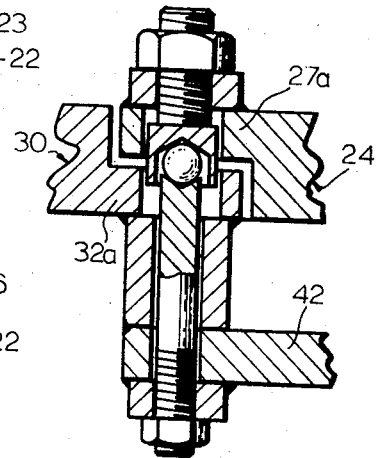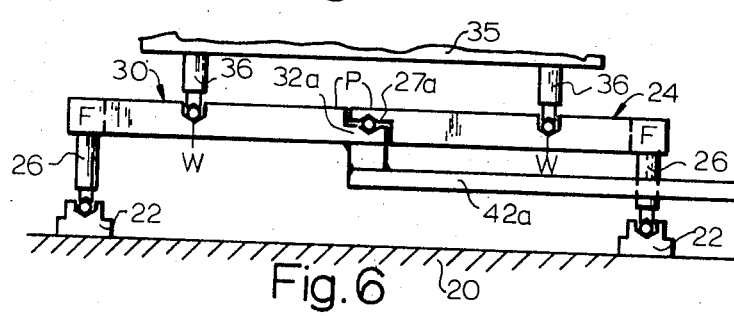

WEIGHT SCALE STRUCTURE

This invention relates to weighing scales and pertains to a device which quickly determines the weight of a load by measuring a known proportion of the power developed by the imposition of the weight load in terms of the total weight load wihout any substantial motion and thus without any appreciable time intervals necessary to stabilize measurement of a load or to return to stable zero measurement.

The various weighing scales of the prior art employing motion from a zero point to a measuring point require a substantial time interval to stabilize during and between measuring periods so that they are not suitable for fast repetitive accurate weighing.

With the foregoing in view, an object of the invention is to provide a weighing scale which is capable of fast repetitive accurate weighing, which has extremely short stabilizing periods for weight measurement and zero return, which is simple in design and construction, inexpensive to manufacture, install and use, and which maintains superior accuracy.

An object of the invention is to measure a known proportion of the power produced in conjunction with gravity by the imposition of the weight load on the scale to obviate any necessity for appreciable motion.

An object of the invention is to use the power developed as a source of measurement because it is substantially instantaneous, invariable, and devoid of motion.

An object of the invention is to provide a weight load receiving platform and to support the platform at proportionally dividing bearing points on like balance beams to proportionally divide the developed power at random between the beams.

An object of the invention is cummulate a known proportion of the power at like ends of the like beams as a true total proportion of power.

An object of the invention is to measure the true proportion as an indication of the total power and thus the total weight of the load.

An object of the invention is to provide a scale device which accurately cummulates a true proportion of the total power developed by the weight load regardless of the point of load imposition on the platform, the movement of the load on the platform, and the increase or decrease of weight load on each individual balance beam.

An object of the invention is to provide a scale device which is suitable for weighing loads traveling on conveyors, chutes, or vehicles.

These and other objects of the invention will become apparent by reference to the following description of a weight scale embodying the invention taken in connection with the accompanying drawings, in which:

FIG. 2 is a top plan somewhat schematic view of the scale portion of the embodiment seen in FIG. 1 with the platform and conveyor deleted.

FIG. 3 is an end elevation view of the scale portion seen in FIG. 2, with a broken away portion of the platform added.

FIG. 4 is a side elevational view of the scale portion seen in FIG. 2, with a broken away portion of the platform added;

FIG. 5 is a view similar to FIG. 4 showing a modification of an extension arm between the beam frames and the weight sensitive load cell.

FIG. 6 is a view similar to FIGS. 4 and 5 showing a longer extension arm; and

FIG. 7 is an enlarged broken away detail view of the center pivot between the frames of FIGS. 5 and 6.

Figure 1:
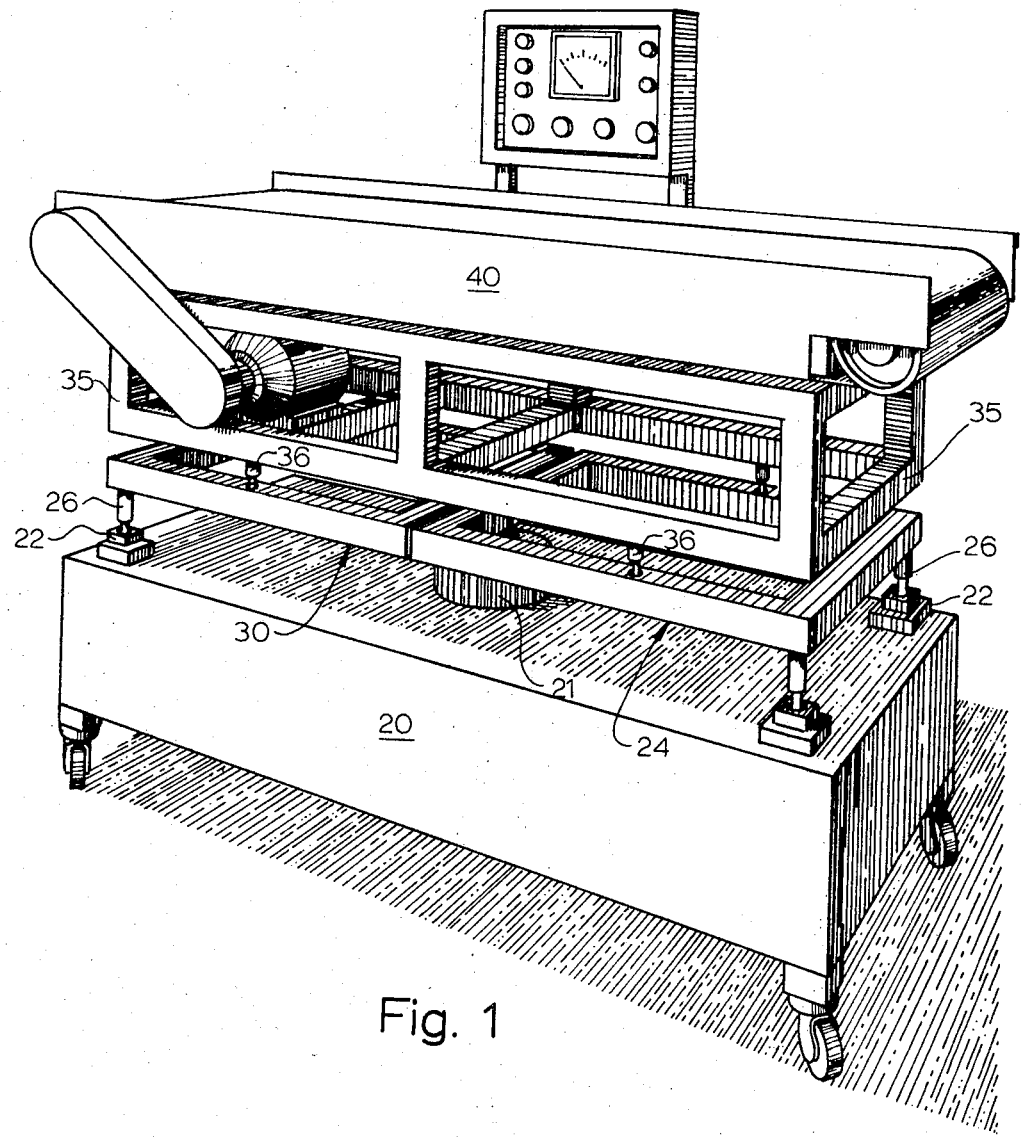
FIG. 1 is a perspective view of a weight scale of the invention integrated in a conveyor section.

Referring now to the drawings wherein like numerals refer to like and corresponding parts throughout the several views, the exemplary weight scale device shown therein to illustrate the invention comprises a base 20. A weight sensitive device 21 is centrally located on the base 20. Two sockets 22 with balls 23 are positioned on the base 20 at one end of the base 20 and constitute a first fulcrum point. Two sockets 22 and balls 23 are positioned at the other end of the base 20 and constitute a second fulcrum point. A first frame 24 lies above the base 20 and has an outer end 25 equipped with feet 26 resting on the balls 23 in the sockets 22 and an inner end 27. A post 28 supports the inner end 27 on the weight sensitive device 21. A second frame 30 lies above the base 20 and has an outer end 31 equipped with feet 26 resting on the balls 23 in the sockets 22 and an inner end 32. The post 28 also supports the inner end 32 of the second frame 30. The frames 24 and 30 constitute balance beams which are fulcrumed at their outer ends and powered at their inner ends.

Each frame 24 and 30 has two laterally spaced paired cups 33 and balls 34. The cups 33 and balls 34 are positioned between the outer ends 25, 31 and the inner ends 27, 32 of each frame 24, 30 respectively. the cup 33 and balls 34 are positioned between the ends of the frame-balance beams 24, 30 and constitute identical weight bearing anti-friction points of each frame-beam. A platform 35 lies above the frames 24, 30 and has paired legs 36 at one end 37 resting on the paired balls 34 and cups 33 of frame 24. The platform 35 has paired legs 36 at the other end 39 resting on the paired balls 34 and cups 33 of frame 30. A powered conveyor section 40 may be carried by the platform 35. Also the platform may be used singly or in combination with other equipment such as chutes and vehicles.

The load to be weighed is imposed on the platform 35. The platform 35 transfer the load to the frames 24 and 30. The frames 24 and 30 as beams proportionally divide the load between the fulcrum points at the feet 36 on the balls 23 at the outer ends 25 and 31 respectively and their inner ends 27, 32 respectively at the post 28 and weight sensitive device 21 by the relative position of the weight point of each frame 24, 30 as constituted by the legs 36 and balls 34. As shown, the proportion is about two to one with the outer fulcrum ends 25, 31 of the frames bearing twice the load of the inner power ends 27, 32 of the frames 24, 30 respectively. Thus one-third the weight load is imposed on the weight device 21 by the post 28 on which both inner ends 27, 32 of the frames 24, 30 bear.

Thus, for example, if a weight of 60 pounds is imposed at the longitudinal center of the platform 35, 30 pounds will impose on the weight points W of each frame 24, 30. Because of the two-to-one proportion between the fulcrum point F and power point P of each frame, 20 pounds will impose on the fulcrum points F and ten pounds will impose on the power points P. The 10 pounds of each power point P of each frame imposes on the post 28 and thus 20 pounds is imposed on the weight device 21. Presuming that the measurement of the weight device 21 reads 20 pounds, this reading is multiplied by 3 and the 20 pound reading equals the true weight of the load of 60 pounds imposed on the platform.

Assuming for a second example, that a weight load of 90 pounds is not centrally positioned on the platform 35 but rather is located at a 80 to 20 percent point nearer to the end 37 of the platform 35, 72 pounds will be imposed on the weight point W of the frame 24 and 18 pounds will be imposed on the weight point W of the frame 30. Frame 24 then imposes 48 pounds on its fulcrum point F and 24 pounds on its power point P. Frame 30 then imposes 12 pounds on its fulcrum point F and 6 pounds at its power point P. The two power point P weights of 24 pounds and 6 pounds are cummulated at the post 28 making a total power weight of 30 pounds which, multiplied by 3, makes a true load weight of 90 pounds imposed on the platform 35.

Assuming, for a third example, that the weight load of 90 pounds is imposed at a 60 to 40 percent point on the platform farther from the end 37 of the platform 35, 36 pounds will be imposed on the weight point W of the frame 24 and 54 pounds will then be imposed on the weight point W of the frame 30. Frame 24 then imposes 24 pounds on its fulcrum point F and 12 pounds on its power point P. Frame 30 then imposes 36 pounds at its fulcrum point F and 18 pounds in its power point P. The two power weights of 18 and 12 are cummulated at the post 28 making a total power weight of 30 pounds which, multiplied by three, makes a true load weight of 90 pounds imposed on the platform 35.

It will thus be understood that should a moving weight load of 90 pounds be imposed on the platform 35 and moving from one end to the other end, that it will move through the 80–20 position, through the central position, through the 60–40 position described and all positions before, between, and after the positions described with the moving weight load first variably being mainly imposed on the first frame, then equally on the frames, and then variably mainly on the second frame but with the total weight imposed on the two frames remaining constant.

It will be understood that the continually moving weight load while imposing changing weight loads on the frames, that the frames impose a true portion of the varying weight on the post which cummulates the varying portional weights as a true proportion of the total weight load on the platform which remains constant and is measured by the weight sensitive device.

It is also important to note that relatively no motion occurs between the members and that only the power changes in response to the differences in total weight loads so that there is no appreciable time period involved between the imposition of the weight load and the measurement. There is also no appreciable time period between the removal of the weight load and the return to null condition. Thus the device can quickly repeatedly weigh loads without any appreciable time dealy as it can measure the weights about as fast as they can be put on and taken off the platform.

It is important to note that the scale device is capable of accurately measuring the weight load without regard to its length-wise position on the platform and that this capability also holds true for different lateral positions of the weight load on the platform as more load imposed on one side of the frames 24 and 30 compensates at the post or power point P and balances out from side-to-side in equilibrium at power point P.

The ball and socket support points and the cup and ball support points thus are not for allowance of any appreciable pivotal motion thereat but rather to insure that substantially all structural resistance and friction to load transfer is reduced to practically zero thereby allowing for extremely accurate transfer to the power points P.

The load sensitive device shown is a load cell. The power imposed on the weight sensitive device is preferable read in terms of milli-volts and the difference between null and measurement converted to pounds, signals, etc., by meters, and my copending U.S. Pat. application Ser. No. 75,469 filed Sept. 25, 1970, shows and describes a suitable load cell and its operation. Other weight sensitive devices may be used as desired. Also more than one weight sensitive device may be used such as at the sides of the frames with the power points P of both frames bearing thereon. Also one or more load cells or weight sensitive devices may be used on each frame independently of the other frame as their measurements are additive and may be cummulated.

To place less power on the weight sensitive device 21 and use it in the range of minimal deflection and greatest accuracy, the inner ends 27a and 32a, FIGS. 5 and 6, may bear upon one another as at the anti-friction ball 41 and an arm 42, 42a, has a base end welded inflexibly to the frame 32a and an extending end 43. The weight sensitive device 21 and post 28 are positioned under the outer end 43 of the arm 42, 42a. Due to the face that there is no appreciable flexing of the arm 42, 42a, and no appreciable pivotal motion in the beam frames 24 and 30, the arm 42 imposes the static pressure of the power developed at P as diminished by the lever advantage to the weight sensitive device 21. In this way the deflection of the weight sensitive device is minimal and it operates in its more accurate range. This is a great advantage in weighing heavy loads.

The invention is limited only by the scope of the claims.

I claim:

1. In combination, a substantially unfluctuating, substantially non-moving scale structure and a driven conveyor and platform having a receiving end and a delivery end for measuring imposed weight load on the conveyor in terms of a known proportional part of the power resulting from the imposed weight load on the conveyor and automatically self-compensating relative to the position and movement of the imposed weight load on said conveyor as it is conveyed from said receiving end of the conveyor to said delivery end of said conveyor comprising;

a base having opposite ends and a central area,
a weight sensitive device on said base spaced from said central area,
a first fulcrum near said one end of said base,
a second fulcrum near said other said end of said base,
a first beam above said base having an outer end pivoted on said first fulcrum,
a second beam above said base having an outer end pivoted on said second fulcrum,
both said beams having inner ends adjacent one another;
each said beam having a weight bearing point intermediate its said inner end and its said outer end;

a conveyor and platform lying above both said beams, and legs supporting said platform resting on said bearing points of both said beams;

weight load imposed on said conveyor and platform at random being divided into separate ambient portions by said legs at said bearing points on said beams;

each said beam proportionally dividing the ambient weight load portion imposed on each said beam between its said fulcrum end and its said inner end;

said first beam at its said inner end bearing on the said inner end of said second beam cumulating their exerted power, and a lever arm extension having opposite lever ends with one said lever end solidly connected at one of its said lever ends to said second beam at said second beam's inner end and with said other lever end extending therefrom;

said weight sensitive device lying under said other projecting lever end of said lever arm;

said projecting lever end of said lever arm bearing on said weight sensitive device as an integral extension of said second beam;

said lever arm thereby dimimishing the load imposed on said weight sensitive device to reduce deflecting motion and resulting fatigue, to increase accuracy of measurement, and to increase life span of said weight sensitive device;

the cumulation of the proportional ambient weight load portion imposed on each said beam inner ends being an accurate proportion of the total weight load imposed on said conveyor and platform which is transmitted to said beam inner ends and in turn transmitted to said weight sensitive device via said lever arm extension as a true proportion of the total weight load on said conveyor and platform with said random division and proportional cumulation compensating for weight load position and movement on said conveyor platform causing the imposition of more weight on one beam than the other at any one time.

* * * * *